United States Patent
Dohrn

(10) Patent No.: US 11,392,857 B1
(45) Date of Patent: Jul. 19, 2022

(54) SYSTEM AND METHOD FOR INITIATING A COMPLETED LADING REQUEST

(71) Applicant: Hammel Companies Inc., Pittsburgh, PA (US)

(72) Inventor: Joseph Charles Dohrn, Woodland Park, CO (US)

(73) Assignee: Hammel Companies Inc., Pittsburgh, PA (US)

( * ) Notice: Subject to any disclaimer, the term of this patent is extended or adjusted under 35 U.S.C. 154(b) by 0 days.

(21) Appl. No.: 17/313,263

(22) Filed: May 6, 2021

(51) Int. Cl.
*G06N 20/00* (2019.01)
*G06Q 50/30* (2012.01)
*G06Q 10/08* (2012.01)

(52) U.S. Cl.
CPC ......... *G06N 20/00* (2019.01); *G06Q 10/0875* (2013.01); *G06Q 10/08355* (2013.01); *G06Q 50/30* (2013.01)

(58) Field of Classification Search
CPC .. G06N 20/00; G06Q 10/08355; G06Q 50/30; G06Q 10/0875
See application file for complete search history.

(56) References Cited

U.S. PATENT DOCUMENTS

| | | | |
|---|---|---|---|
| 7,385,529 | B2 | 6/2008 | Hersh |
| 7,774,284 | B2 | 8/2010 | Williams |
| 9,619,775 | B1 | 4/2017 | Saito |
| 10,074,065 | B2 | 9/2018 | Jones |
| 2004/0054570 | A1* | 3/2004 | Streetman ............... G06Q 10/06 705/7.25 |
| 2005/0246192 | A1* | 11/2005 | Jauffred ........... G06Q 10/08355 705/338 |
| 2008/0306795 | A1* | 12/2008 | Ho ....................... G06Q 10/047 705/7.26 |

(Continued)

OTHER PUBLICATIONS

A. Abedalla et al. "MTRecS-DLT: Multi-Modal Transport Recommender System using Deep Learning and Tree Models." 2019 Sixth International Conference on Social Networks Analysis, Management and Security (SNAMS), pp. 274-278. (Year: 2019).*
Mohamed Yacine Gheraibia and Charles Gouin-Vallerand. "Intelligent Mobile-Based Recommender System Framework for Smart Freight Transport". In Proceedings of the 5th EAI International Conference on Smart Objects and Technologies for Social Good, p. 219-222. (Year: 2019).*

(Continued)

*Primary Examiner* — Nathan A Mitchell
(74) *Attorney, Agent, or Firm* — Caldwell Intellectual Property Law

(57) ABSTRACT

A system for initiating a completed lading request includes a computing device configured to obtain a lading request from a client device, wherein the lading request comprises a communication detail datum, determine an logical route, wherein determining the logical route further comprises receiving a conveyor indicator, identifying a spot signature as a function of the conveyor indicator, training a route machine-learning mode using a route training data correlating the spot signature to the lading request, and determining the logical route as a function of the spot signature and the lading request using the trained route machine-learning model, and initiate the completed lading request, wherein initiating the lading request further comprises receiving an acknowledgment element, and initiating the completed lading request as a function of the acknowledgement element, and initiating the completed lading request as a function of the acknowledgement element.

20 Claims, 8 Drawing Sheets

(56) References Cited

U.S. PATENT DOCUMENTS

| | | | |
|---|---|---|---|
| 2012/0078611 A1* | 3/2012 | Soltani | G06F 3/167 |
| | | | 704/9 |
| 2015/0006428 A1* | 1/2015 | Miller | G06Q 10/0835 |
| | | | 705/336 |
| 2015/0161696 A1* | 6/2015 | Jones | G06Q 10/08345 |
| | | | 705/26.4 |
| 2017/0270468 A1* | 9/2017 | Natarajan | G06Q 30/08 |
| 2018/0068269 A1 | 3/2018 | Pillai | |
| 2018/0240066 A1 | 8/2018 | Streebin | |
| 2019/0087778 A1* | 3/2019 | Evans, Jr. | G06Q 10/06 |
| 2020/0042938 A1* | 2/2020 | Goncalves | G06Q 10/067 |
| 2020/0134557 A1* | 4/2020 | Pevzner | G06N 20/00 |
| 2020/0327492 A1 | 10/2020 | Weiby | |
| 2021/0027241 A1 | 1/2021 | Burke | |
| 2021/0201262 A1* | 7/2021 | Damon | G01C 21/3691 |

OTHER PUBLICATIONS

Barua et al. "Machine learning for international freight transportation management: A comprehensive review". Research in Transportation Business & Management, vol. 34. (Year: 2020).*

Huff, Aaron. "Freight matching machine: fleets use new tech to optimize loads". Retrieved from <https://www.ccjdigital.com/print/content/14938968> on Jul. 15, 2021. Originally published Oct. 18, 2019. (Year: 2 019).*

Retreived from: https://tai-software.com/shipping-ai/ Title: Shipping AI and its Possibilities Date: Apr. 13, 2021 By: Tai.

Retrieved from: https://convoy.com/blog/freight-procurement-machine-learning/ Title: Automating freight procurement with machine learning Date: Jul. 23, 2020 By: Convoy Team.

* cited by examiner

US 11,392,857 B1

SYSTEM AND METHOD FOR INITIATING A COMPLETED LADING REQUEST

FIELD OF THE INVENTION

The present invention generally relates to the field of artificial intelligence. In particular, the present invention is directed to a system and method for initiating a completed lading request.

BACKGROUND

Machine-learning methods are increasingly valuable for analysis of patterns and problem-solving using large quantities of data. However, where the data is large and varied enough, optimizing instructions for users from machine-learning outputs can become untenable, especially with tradeoffs between sophistication and efficiency.

SUMMARY OF THE DISCLOSURE

In an aspect, a system for initiating a completed lading request includes a computing device configured to obtain a lading request from a client device, wherein the lading request comprises a communication detail datum, determine an logical route as a function of the lading request, wherein determining the logical route further comprises receiving a conveyor indicator, identifying a spot signature as a function of the conveyor indicator, training a route machine-learning mode using a route training data correlating the spot signature to the lading request, and determining the logical route as a function of the spot signature and the lading request using the trained route machine-learning model, and initiate the completed lading request as a function of the logical route, wherein initiating the lading request further comprises receiving an acknowledgment element, and initiating the completed lading request as a function of the acknowledgement element, and initiating the completed lading request as a function of the acknowledgement element.

In another aspect, a method for initiating a completed lading request includes obtaining, by a computing device, a lading request from a client device, wherein the lading request comprises a communication detail datum, determining, by the computing device, an logical route as a function of the lading request, wherein determining the logical route further comprises receiving a conveyor indicator, identifying a spot signature as a function of the conveyor indicator, training a route machine-learning mode using a route training data correlating the spot signature to the lading request, and determining the logical route as a function of the spot signature and the lading request using the trained route machine-learning model, and initiating, by the computing device, the completed lading request as a function of the logical route, wherein initiating the lading request further comprises receiving an acknowledgment element, and initiating the completed lading request as a function of the acknowledgement element, and initiating the completed lading request as a function of the acknowledgement element.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for initiating a completed lading request. In an embodiment, this disclosure can be used to obtain a lading request from a client device that includes a communication detail datum. Aspects of the present disclosure can also be used to determine a logical route. This is so at least in part, because this disclosure utilizes a machine-learning model and a spot signature. Aspects of the present disclosure allow for initiating the completed lading request as a function of the logical route. Exemplary embodiments illustrating aspects of the present disclosure are described below in the context of several specific examples.

Figure 1:
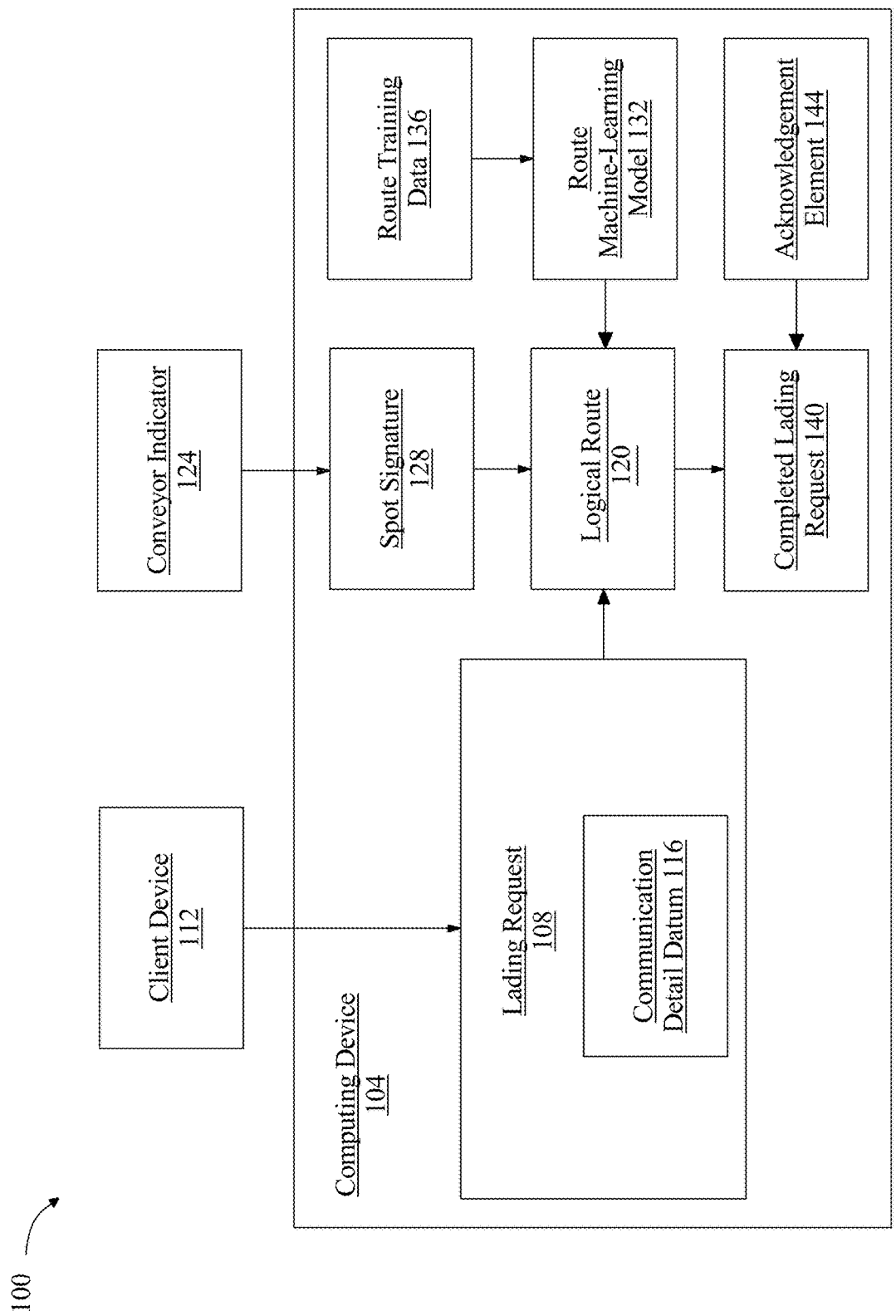
FIG. 1 is a block diagram illustrating an exemplary embodiment of a system for initiating a completed lading request.

Referring now to FIG. 1, an exemplary embodiment of a system 100 for initiating a completed lading request is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 obtains a lading request 108. As used in this disclosure a "lading request" is a confirmation by a user to initiate a transport request. In an embodiment, without limitation, lading request 108 may include a request from a client device 112. As used in this disclosure a "client device" is a computing device configured to receive a lading request. For example and without limitation, client device 112 may include a mobile device, desktop device, or other terminal device permitting a client to interact with system 100 and/or computing device 104 including without limitation by operation of a web browser or native application instantiating one or more user interfaces as directed, for instance, by server-side and/or client-side programs provided by computing device 104 in the form of a "website" or similar network-based application or suite of applications. Client device 112 may include, without limitation, a display in communication with computing device 104; the display may include any display as described in the entirety of this disclosure such as a light emitting diode (LED) screen, liquid crystal display (LCD), organic LED, cathode ray tube (CRT), touch screen, or any combination thereof. Output data from computing device 104 may be configured to be displayed on client device 112 using an output graphical user interface. An output graphical user interface may display any output as described in the entirety of this disclosure. In an embodiment, and without limitation, client device 112 allow a user to select an icon, entering a textual string of data, selecting a text box, verbally confirming, and the like. For example and without limitation, obtaining lading request 108 from client device 112 may include a user selecting a text box labeled "New Transport Request".

In an embodiment, and still referring to FIG. 1, obtaining lading request 108 may include receiving a plurality of communications from client device 112. The "plurality of communications" as described herein, is data detailing the request items from the client to the supplier. An item may include any product a supplier may sell, without limitation. For example and without limitation, each communication of the plurality of communications may include a purchase order from the user to the supplier. Each communication of the plurality of communications may include, as an example and without limitation, information detailing the type of item, quantity of the item, agreed upon price of the item, anticipated deliver state, any combination thereof, and/or the like. Persons skilled in the art, upon reviewing the entirety of this disclosure, will be aware of various communications that may be employed as the plurality of communications as described herein. In an embodiment, and without limitation, lading request 108 comprises a communication detail datum 116 from each communication of the plurality of communications received. A "communication detail datum," as used in this disclosure, is an element of data denoting a one or more details and/or requirements associated with the transport of the item. For example, and without limitation, communication detail datum 116 may include a unit identifier datum. A "unit identifier datum" as used in this disclosure, is a unique identifier associated with each item of the plurality of items included in each communication of the plurality of communication received from client device 112; a unique identifier may include any combination of alpha and/or numerical values, wherein there may be any total of values included in the unique identifier. Each unique identifier of unit identifier datum may be associated with an item able to be transmitted from a supplier to a destination. For example, and without limitation, a unit identifier datum may include a unique identifier of a combination of seven alpha and/or numeric values, such as "N303363", "K994002", "F110482", "AKK13257", and the like. In an embodiment, there is no limitation to the number of unit identifier datum included in each communication of the plurality of communication. Persons skilled in the art, upon reviewing the entirety of this disclosure, will be aware of various examples of unique identifiers that may be used as the unit identifier datum consistently with this disclosure.

Still referring to FIG. 1, communication detail datum 116 may include a terminus datum. An "terminus datum" as used in this disclosure, is a final destination of a lading obtained. In an embodiment, for example and without limitation, a final destination may include details of a physical location, such as an address, coordinates, a unique identifier correlating to a physical location, or the like. For example and without limitation, a final destination may include "Magnus Warehousing 1301 39$^{th}$ Street N Fargo, N. Dak. 58102." Persons skilled in the art, upon reviewing the entirety of this disclosure, will be aware of various examples of physical locations that may be used as the associated terminus datum consistently with this disclosure.

Continuing to refer to FIG. 1, communication detail datum 116 may further include a unit quantity datum, a unit detail datum, and/or a bound datum. A "unit quantity datum" as used in this disclosure, is a quantity of an item of a plurality of items included in a lading request. A unit quantity datum, in an embodiment, may include any numeric value. For example, and without limitation, the unit quantity datum may include a quantity of "5", "25", "125" and the like. In an embodiment, there is no limitation to the number of unit quantity datum included in each lading request received from client device 112. Persons skilled in the art, upon reviewing the entirety of this disclosure, will be aware of various numeric values that may be used as the unit quantity datum consistently with this disclosure. A "unit detail datum," as used in this disclosure, is a textual identifier, which may include any form of textual data as described above, detailing a description of each item of the plurality of items included in each lading request. In an embodiment, without limitation, a unit detail datum may include a technical name of an item, a use of an item, a size of the item, a functional location of the item, advertising name for an item, any combination thereof, or the like. For example and without limitation, a unit detail datum may include brief descriptions, such as "Bracket, Cab Support", "Bracket, Front Right Bulkhead", "Angle, Platform", "Flange", "323E Track—Z-Lug", "42 in. Mower Blade", to name a few. In an embodiment, a number of unit detail datums included within each lading request may be correlated directly to the number of the unit identifier datums; however there is no limitation as to the quantity of unit detail datum in each lading request. Persons skilled in the art, upon reviewing the entirety of this disclosure, will be aware of various examples of descriptions of items that may be used as unit detail datums consistently with this disclosure. A "bound datum" as used in this disclosure, is a date by which each lading request is to be delivered to the terminus datum. A date of a bound datum may be arranged in any format utilized for communicating the date. For example and without limitation, a bound datum for a delivery date of Jan. 8, 2020 may include, "01/08/2020", "Jan. 8, 2020", "2020-01-08", "08012020", "01082020", "Jan082020", any combination thereof, or the like. Persons skilled in the art, upon reviewing the entirety of this disclosure, will be aware of various examples of date formats that may be used for a bound datum consistently with this disclosure.

Still referring to FIG. 1, communication detail datum may alternatively and/or additionally be obtained from lading request 108 using a language processing module. In an embodiment, data information describing the unit quantity datum, the unit detail datum, bound datum, and the like may alternatively or additionally be obtained from one or more communication of the plurality of communications using language processing module. Language processing module may include any hardware and/or software module. Language processing module may be configured to obtain, from the one or more documents, one or more words. One or more words may include, without limitation, strings of one or characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may compare extracted words to categories of unit identifier data recorded at computing device 112, one or more categories of terminus data recorded at computing device 104, one or more categories of unit quantity data recorded at computing device 104, one or more categories of unit detail data recorded at computing device 104, and/or one or more categories of bound data recorded at computing device 104; such data for comparison may be entered on computing device 104 as described above using data inputs or the like. In an embodiment, one or more categories may be enumerated, to find total count of mentions in such documents. Alternatively or additionally, language processing module may operate to produce a language processing model. Language processing model may include a program automatically generated by computing device 104 and/or language processing module to produce associations between one or more words extracted from at least a document and detect associations, including without limitation mathematical associations, between such words, and/or associations of extracted words with categories of unit identifier data, categories of associated terminus datum, categories of unit quantity data, categories of unit detail data, and/or categories of bound data. Associations between language elements, where language elements include for purposes herein extracted words, categories of unit identifier data, categories of associated terminus datum, categories of unit quantity data, categories of unit detail data, and/or categories of bound data may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given categories of unit identifier data, categories of associated terminus datum, categories of unit quantity data, categories of unit detail data, and/or categories of bound data. As a further example, statistical correlations and/or mathematical associations may include probabilistic formulas or relationships indicating a positive and/or negative association between at least an extracted word and/or a given categories of unit identifier data, categories of associated terminus datum, categories of unit quantity data, categories of unit detail data, and/or categories of bound data; positive or negative indication may include an indication that a given document is or is not indicating a categories of unit identifier data, categories of associated terminus datum, categories of unit quantity data, categories of unit detail data, and/or categories of bound data is or is not significant. For instance, and without limitation, a negative indication may be determined from a phrase such as "Mar. 34, 2020," whereas a positive indication may be determined from a phrase such as "Mar. 29, 2020," as an illustrative example; whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device 104, and/or the like.

Still referring to FIG. 1, language processing module, and/or computing device 104 may generate the language processing model by any suitable method, including without limitation a natural language processing classification algorithm; language processing model may include a natural language process classification model that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between an extracted word category of physiological data, a given relationship of such categories to prognostic labels, and/or a given category of prognostic labels. There may be a finite number of category of physiological data, a given relationship of such categories to prognostic labels, and/or a given category of prognostic labels to which an extracted word may pertain; an HMI inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and/or computing device 104 may then use such associations to analyze words extracted from one or more documents and determine that the one or more documents indicate significance of a categories of unit identifier data, categories of associated terminus datum, categories of unit quantity data, categories of unit detail data, and/or categories of bound data. In an embodiment, computing device 104 may perform this analysis using a selected set of significant documents, such as documents identified by one or more experts as representing good science, good aviation analysis, good aviation standard, or the like; experts may identify or enter such documents via user device as described below, or may communicate identities of significant documents according to any other suitable method of electronic communication, or by providing such identity to other persons who may enter such identifications into computing device 104. Documents may be entered into computing device 104 by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, computing device 104 may automatically obtain the document using such an identifier, for instance by submitting a request to a database or compendium of documents such as JSTOR as provided by Ithaka Harbors, Inc. of New York.

Still referring to FIG. 1, obtaining lading request 108 may include storing lading request 108 in an internal memory, wherein an internal memory is storage component configured to store lading requests and/or communications from client device 112 as described below, in reference to FIG. 2. In an embodiment, and without limitation, internal database may be configured to identify an origination datum, wherein an origination datum is an element of data representing one or more geographical locations and/or origination locations of a unit and/or article, as described below, in reference to FIG. 2. Internal memory may be configured to determine a progression vector as a function of the origination datum and terminus datum, wherein a progression vector is a data structure that represents one or more a quantitative values and/or measures progression, as described below in detail, in reference to FIG. 2. In an embodiment, progression vector may be determined as a function of origination datum and terminus datum using a classifier, wherein a classifier is described below in reference to FIG. 2. In an embodiment, and without limitation, updating internal memory may further comprise receiving an input from an internal database, wherein an internal database is described below, in reference to FIG. 3. In an embodiment and without limitation, updating internal memory may include receiving an input of an available communication from internal database as a function of a ready datum. A "ready datum" as used in this disclosure, is a datum describing a date a client plans to execute lading request 108. For example, and without limitation, ready datum may denote a manually entered date. In another embodiment, ready datum may denote a date as a function of a user selecting a date from a calendar display, selecting a date from a drop-down menu, and the like. For example and without limitation, ready datum may include the selected date of "31" on a calendar display of the month of July in the year 2020. In an embodiment and without limitation, updating internal memory may include receiving an input of a unit identifier from internal database as a function of the lading request 108 from client device 112.

Continuing to refer to FIG. 1, updating internal memory may include receiving an input of a unit detail datum from internal database as a function of the unit identifier obtained from client device 112. Receiving the unit detail datum input from internal database may include retrieving the unit detail datum associated with the unit identifier from internal database, wherein both the unit detail datum and the unit identifier are associated to the lading request. The unit detail datum may include any unit detail datum as described in further detail above. The unit identifier may include any unit identifier as described in further detail above. In an embodiment, and without limitation, updating internal memory may include receiving an input of an allocation code from internal database as a function of the lading request obtained from client device 112. An "allocation code" as used in this disclosure, is a strong of alphanumeric characters assigned to each billing account associated with a client and/or client device 112. In an embodiment without limitation, the allocation code ensures the cost associated with lading request is associated to the proper billing account of the client and/or client device. For example and without limitation, the allocation code may include a four-character identifier, such that one client and/or client device 112 has allocation codes corresponding to their warehouse locations, wherein the allocation codes include "9M00", "9M01", "9M02", "9M03", "9M04" and "9M05". As a further example and without limitation, the allocation code may include a three-character identifier, such that one client and/or client device 112 has allocation codes responding to the item type, wherein the allocation codes include "77A", "77B". "77C" "77D" and "77E". The allocation code may be stored in and/or collected from internal database. Internal database may include any database and/or datastore as described in further detail below in reference to FIG. 2.

Still referring to FIG. 1, computing device 104 determines a logical route 120 as a function of lading request 108. As used in this disclosure an "logical route" is a transfer path and/or route to transfer a unit and/or article from the origination location to the terminus location. For example, and without limitation, logical route 120 may denote a transfer path along a highway and/or road to transport a unit and/or article. As a further non-limiting example, logical route 120 may denote a transfer path along one or more mediums include land, ocean, air, and the like thereof. As a further non-limiting example, logical route 120 may include one or more couriers that are required to complete the lading request, such as a first courier to transport a first portion of the lading request, a second courier to transport a second portion of the lading request, a third courier to transport a third portion of the lading request, and the like thereof. In an embodiment, and without limitation, logical route 120 is determined as a function of receiving a conveyor indicator 124. As used in this disclosure a "conveyor indicator" is an element of data denoting a client stipulation for a lading request. For example, and without limitation, conveyor indicator 124 may include a maximum cost, a delivery time limit, a courier preference, and the like thereof. In an embodiment, and without limitation, conveyor indicator 124 may denote that a courier must deliver the unit in no more than 5 days. In another embodiment, and without limitation, conveyor indicator 124 may denote that a shipping cost for a client may not exceed $400.00. In another embodiment, and without limitation, conveyor indicator may denote that a client has a preference for a courier service such as a particular company and/or organization including but not limited to the United States Postal Service, United Parcel Service, FedEx, and the like thereof.

Still referring to FIG. 1, computing device 104 determines logical route 120 by identifying a spot signature 128 as a function of conveyor indicator 124. As used in this disclosure a "spot signature" is a monetary value associated with the lading request. For example, and without limitation, spot signature 128 may be identified as a cost of $720.00 over 6 days to transfer the unit from the origination location to the terminus location, wherein the conveyor indicator notes that the lading request should not exceed $800.00, and a shipping time should not exceed 7 days. In another embodiment, and without limitation, spot signature 128 may be identified as a cost of $200.00 over a 7 days to transfer the unit from the origination location to the terminus location, wherein the conveyor indicator noes that the lading request must transport the unit using the United States Postal Service. In an embodiment, and without limitation, computing device 104 may identify spot signature 128 as a function of obtaining a precontractual obligation. As used in this disclosure a "precontractual obligation" is a contract denoting one or more conveyor indicators. For example, and without limitation, precontractual obligation may denote that a contract stipulates that a cost must not exceed a price of $100.00 when shipping to a first region, wherein a first region is a geographical location identified in the precontractual obligation. As a further non-limiting example, precontractual obligation may denote that a contract stipulates that a shipping time must not exceed 30 days when shipping to a second region. In an embodiment, and without limitation, precontractual obligation may be obtained as a function of an available conveyor. As used in this disclosure an "available conveyor" is a conveyor and/or courier that is capable of transporting the unit and/or article from the origination location to the terminus location. IN an embodiment, and without limitation, available conveyor may include a courier and/or carrier capable of transporting a unit and/or article from a first region to a second region, wherein transporting from the first region to the second region progresses the unit and/or article closer to the terminus location. For example, and without limitation, a transfer route may include 5 regions, wherein available conveyors may transport the unit and/or article from the first region to the second region, third region, fourth region, fifth region, and/or terminus location.

Still referring to FIG. 1, computing device 104 determines logical route 120 as a function of training a route machine-learning model 132. As used in this disclosure a "route machine-learning model" is a machine-learning model to determine an logical route output given lading requests and spot signatures as inputs, wherein a "machine-learning model," as used herein, is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language. Route machine-learning model may include one or more route machine-learning processes such as supervised, unsupervised, or reinforcement machine-learning processes that computing device 104 and/or a remote device may or may not use in the determination of logical route 120. As used in this disclosure "remote device" is an external device to computing device 104. Route machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 1, computing device 104 may train route machine-learning process as a function of a route training set 136. As used in this disclosure "route training set" is a training set that correlates a lading request and/or spot signature to a logical route. For example, and without limitation, route training set 136 may relate a lading request comprising shipping a unit from New York to Maine and a spot signature of $82.00 to transfer the unit over 6 days from a first conveyor and $103.00 to transfer the unit over 2 days from a second conveyor to a logical route comprising both the first conveyor and second conveyor to transfer the unit over 3 days with a total cost of $92.00. Route training set 136 may be received as a function of user-entered valuations of lading requests, spot signatures, and/or logical routes. Computing device 104 may receive route training set 136 by receiving correlations of lading requests, and/or spot signatures that were previously received and/or determined during a previous iteration of determining logical routes. Route training set 136 may be received by one or more remote devices that at least correlate a lading request and/or spot signature to a logical route. Route training set 136 may be received in the form of one or more user-entered correlations of a lading request and/or spot signature to a logical route.

Still referring to FIG. 1, computing device 104 may receive route machine-learning model 132 from a remote device that utilizes one or more route machine learning processes, wherein a remote device is described above in detail. For example, and without limitation, a remote device may include a computing device, external device, processor, and the like thereof. Remote device may perform the route machine-learning process using the route training set to generate logical route 120 and transmit the output to computing device 104. Remote device may transmit a signal, bit, datum, or parameter to computing device 104 that at least relates to logical route 120. Additionally or alternatively, the remote device may provide an updated machine-learning model. For example, and without limitation, an updated machine-learning model may be comprised of a firmware update, a software update, a route machine-learning process correction, and the like thereof. As a non-limiting example a software update may incorporate a new lading request that relates to a modified spot signature. Additionally or alternatively, the updated machine learning model may be transmitted to the remote device, wherein the remote device may replace the route machine-learning model with the updated machine-learning model and determine the logical route as a function of the lading request using the updated machine-learning model. The updated machine-learning model may be transmitted by the remote device and received by computing device 104 as a software update, firmware update, or corrected route machine-learning model. For example, and without limitation route machine-learning model 132 may utilize a random forest machine-learning process, wherein the updated machine-learning model may incorporate a gradient boosting machine-learning process.

In an embodiment, and still referring to FIG. 1, computing device 104 may determine logical route 120 as a function of identifying a demarcation time. As used in this disclosure a "demarcation time" is a probabilistic time period a unit and/or article may take to be transported, wherein a time period is a unit of time such as, but not limited to, second, minutes, hours, days, weeks, months, years, and the like thereof. For example, and without limitation demarcation time may denote that a unit and/or article has a 95% probability of being delivered within 5 days. As a further non-limiting example, demarcation time may denote that a unit and/or article has a 20% probability of being delivered with 7 days. In an embodiment and without limitation, identifying demarcation time may include identifying a traffic element. As used in this disclosure a "traffic element" is an element of data denoting one or more traffic patterns and/or congestion circumstances. For example, and without limitation traffic element may denote that a first route has a minimal traffic element, wherein a second route has large traffic element. In an embodiment, and without limitation, demarcation time may denote that a unit and/or article has a 92% probability of being transported in 5 days along a first route comprising a minimal traffic element, wherein the unit and/or article has a 72% probability of being transported in 5 days along a second route comprising a large traffic element. In an embodiment, computing device 104 may determine logical route 120 as a function of demarcation time and lading request 108 using a demarcation machine-learning model. As used in this disclosure "demarcation machine-learning model" is a machine-learning model to produce a logical route output given demarcation times and lading requests as inputs; this is in contrast to a non-machine learning software program where the commands to be executed are determined in advance by a user and written in a programming language. Demarcation machine-learning model may include one or more demarcation machine-learning processes such as supervised, unsupervised, or reinforcement machine-learning processes that computing device 104 and/or a remote device may or may not use in the determination of logical route 120, wherein a remote device is described above in detail. Demarcation machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

Still referring to FIG. 1, computing device 104 may train demarcation machine-learning process as a function of a demarcation training set. As used in this disclosure "demarcation training set" is a training set that correlates a demarcation time and/or lading request to a logical route. For example, and without limitation, a demarcation time of a 74% probability of being transported in 7 days along a first route comprising a mediocre traffic element and a lading request of a maximal transport time of 7 days may relate to a logical route of a second route containing a 92% probability of being transported in 5 days. The demarcation training set may be received as a function of user-entered valuations of demarcation times, lading requests, and/or logical routes. Computing device 104 may receive demarcation training set by receiving correlations of demarcation times, and/or lading requests that were previously received and/or determined during a previous iteration of determining logical routes. The demarcation training set may be received by one or more remote devices that at least correlate a demarcation time and/or lading request to a logical route. The demarcation training set may be received in the form of one or more user-entered correlations of a demarcation time and/or lading request to a logical route.

Still referring to FIG. 1, computing device 104 may receive demarcation machine-learning model from a remote device that utilizes one or more demarcation machine learning processes, wherein a remote device is described above in detail. For example, and without limitation, a remote device may include a computing device, external device, processor, and the like thereof. Remote device may perform the demarcation machine-learning process using the demarcation training set to generate logical route 120 and transmit the output to computing device 104. Remote device may transmit a signal, bit, datum, or parameter to computing device 104 that at least relates to logical route 120. Additionally or alternatively, the remote device may provide an updated machine-learning model. For example, and without limitation, an updated machine-learning model may be comprised of a firmware update, a software update, a demarcation machine-learning process correction, and the like thereof. As a non-limiting example a software update may incorporate a new demarcation time that relates to a modified lading request. Additionally or alternatively, the updated machine learning model may be transmitted to the remote device, wherein the remote device may replace the demarcation machine-learning model with the updated machine-learning model and determine the logical route as a function of the demarcation time using the updated machine-learning model. The updated machine-learning model may be transmitted by the remote device and received by computing device 104 as a software update, firmware update, or corrected demarcation machine-learning model. For example, and without limitation demarcation machine-learning model may utilize a random forest machine-learning process, wherein the updated machine-learning model may incorporate a gradient boosting machine-learning process. In an embodiment, and without limitation, demarcation machine-learning model may identify logical route as a function of one or more classifiers, wherein a classifier is described below in detail.

In an embodiment, and still referring to FIG. 1, computing device 104 may determine logical route 120 as a function of generating an index of available conveyors, wherein an index of available conveyors is described below in detail. In an embodiment, and without limitation, index of available conveyors may be generated as a function of spot signature 128. For example, and without limitation, available conveyors may be arranged in a ranked list, wherein the first entry of the ranked list is the lowest spot signature and/or the last entry of the ranked list is the largest spot signature. As a further non-limiting example, index of available conveyors may be generated as a function of a shipping time, wherein a shipping time is described below in detail, in reference to FIG. 7. For example, and without limitation, index of available conveyors may include arranging in a ranked list, a list of available conveyors and the proposed shipping time to transport the unit and/or article from the origination location to the terminus location. In an embodiment, and without limitation, computing device 104 may determine logical route 120 as a function of displaying the index of available conveyors on a display window. As used in this disclosure a "display window" is a portion of a display of client device 112 and/or computing device 104 to display lading request 112, communication detail datum 116, the unit identifier, and the like thereof. Display window may be an output graphical user interface, as described in further detail above. Display window may be a window that ordinarily displays content when a user activates a link, such as a lading request link, a unit identifier link, and the like thereof. For instance, where the display is a web browser, user selection of a link may cause client device 112 to display content corresponding to a URL included in the link in display window. Display window and/or lading request 112 may be configurable using executables, scripting languages, markup languages, and the like, including without limitation HTML, extensible stylesheet language transformations (XSLT), JavaScript, applets, and the like. Display window may be a window that ordinarily displays content when a client activates a link such as lading request link. For instance, where display window is a web browser, user selection of a link may cause the display window to display content corresponding to a URL included in the link in display window.

In an embodiment, and still referring to FIG. 1, computing device 104 may receive a user input as a function of the index of available conveyors. As used in this disclosure a "user input" is an entry and/or communication generated by the user and/or client. For example, and without limitation, user input may include a user and/or client selecting an available conveyor from the index of available conveyors. In an embodiment and without limitation, computing device 104 may receive user input as a function of the user entering and/or selecting a button and/or drop-down item from display window. For example, and without limitation, computing device 104 may present the index of available conveyors on the display window, wherein the client and/or user enters a user input to select one or more preferred available conveyors. In an embodiment, and without limitation, computing device 104 may display the index of available conveyors along with the proposed transfer route, wherein the user and/or client may enter user input to denote one or more preferred routes and/or transfer paths. For example, and without limitation, a user may have a preferred route that the shipment does not transfer through a particular town, city, state, country, region, and the like thereof. In an embodiment, and without limitation, computing device 104 may determine logical route 120 as a function of the received user input. For example, and without limitation, computing device 104 may determine that logical route 120 includes a route that avoids a particular area such as the northeast region of the United States of America.

Still referring to FIG. 1, computing device 104 initiates a completed lading request 140 as a function of logical route 120. As used in this disclosure a "completed lading request" is a finalized lading request that is transferred to the conveyor and/or courier. For example, and without limitation, completed lading request 140 may include a lading request that is approved and/or finalized on client device 112, computing device 104, and/or a remote device that a conveyor and/or courier may communicate with. Completed lading request 140 may be initiated as a function of receiving an acknowledgement element 144. As used in this disclosure an "acknowledgement element" is an element of data denoting a verification and/or acknowledgement of lading request 108. In an embodiment, and without limitation, acknowledgement element 144 may be a unique identifier associated with completed lading request 140, wherein the unique identifier may include any alpha-numeric character. In an embodiment, acknowledgement element 144 may include any number of characters in any arrangement. In an embodiment and without limitation, acknowledgement element 144 can be used as a reference to locate completed lading request 140 within system 100 and/or computing device 104. For example and without limitation, acknowledgement element 144 may include a unique identifier associated with completed lading request 140, such as "A100-0038001". In an embodiment, and without limitation, computing device 104 may receive acknowledgment element 144 as a function of transmitting a notification to a conveyor. As used in this disclosure a "notification" is a datum, signal, bit, and/or signal that at least conveys a message to a conveyor. For example, and without limitation, a notification may include one or more wireless telecommunications. The wireless communication signals may include, without limitation, radio waves, electric fields, mobile broadband, Wi-Fi, and/or the BLUETOOTH protocol promulgated by Bluetooth SIG, Inc. of Kirkland, Wash., wherein Bluetooth is a wireless technology used for exchanging data between fixed mobile devices over short distances using ultra high frequency radio waves between 2.402 GHz to 2.480 GHz. As a further non-limiting example, notification may include a bill of lading. As used in this disclosure a "bill of lading" is a receipt and/or acknowledgment of the lading request. For example, and without limitation, computing device 104 may transmit a notification comprising a bill of lading to a conveyor, wherein computing device 104 receives acknowledgement element 144 as a function of the transmitted bill of lading.

In an embodiment, and still referring to FIG. 1, computing device 104 may initiate completed lading request 140 by presenting completing lading request in the display window. For example, and without limitation, presenting completed lading request 140 may include any means of displaying as described in the entirety of this disclosure. In an embodiment and without limitation, displaying completed lading request 140 may include a push notification, an email, a textual display, and/or the like. For example and without limitation, displaying completed lading request 140 may include a push notification including a textual display of acknowledgement element 144 comprising "E2200-001". Persons skilled in the art, upon reviewing the entirety of this disclosure, will be aware of various means of presenting completed lading request 140 that may be employed.

Figure 2:
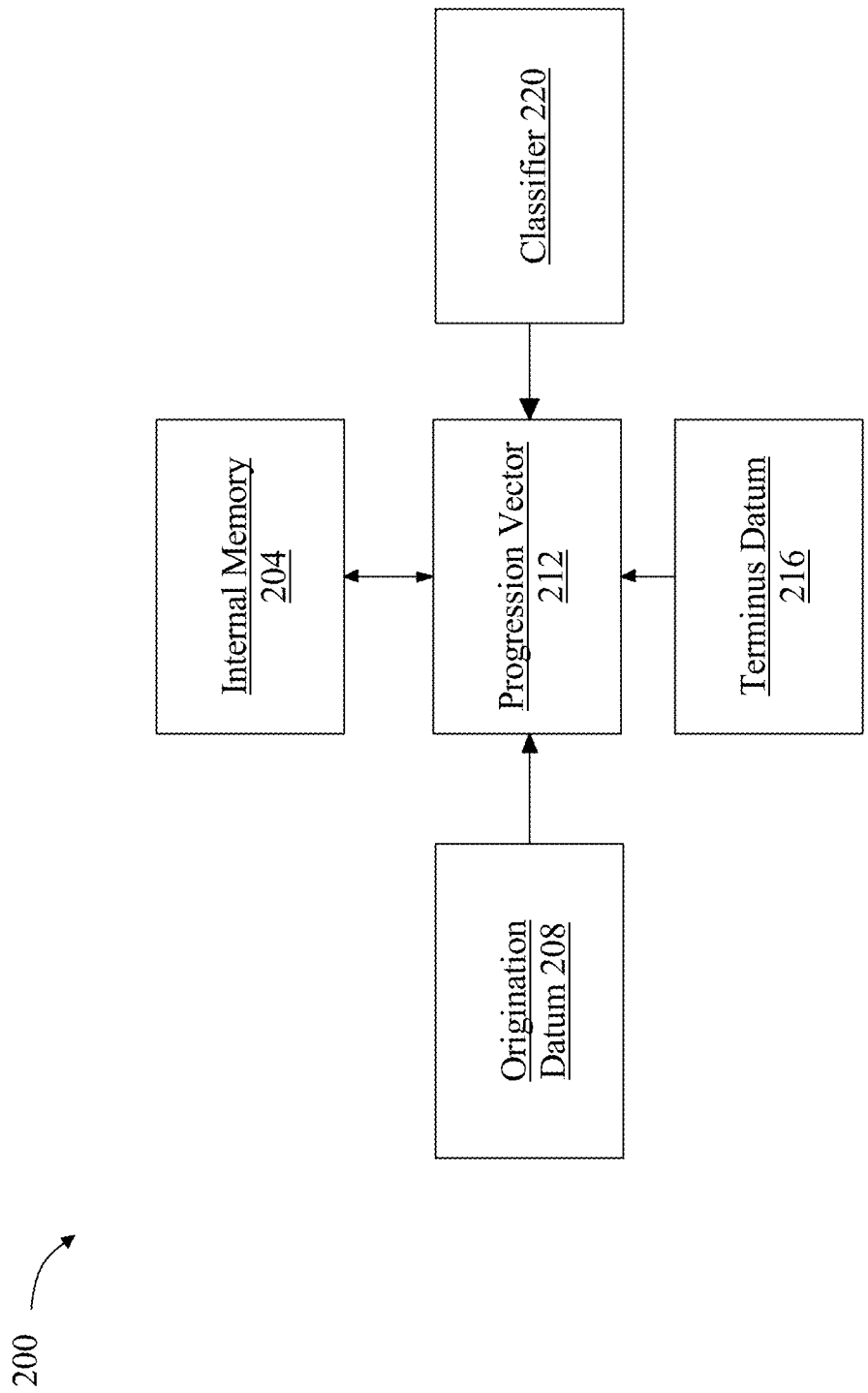
FIG. 2 is a block diagram illustrating an exemplary embodiment of an internal memory.

Now referring to FIG. 2, an exemplary embodiment 200 of an internal memory 204 is illustrated. As used in this disclosure an "internal memory" is storage component configured to store lading requests and/or communications from client device 112. For example, and without limitation, computing device 104 may store one or more communications such as previous lading requests in internal memory 204. In an embodiment, and without limitation, internal memory 204 may be configured to identify an origination datum 208. As used in this disclosure an "origination datum" is an element of data representing one or more geographical locations and/or origination locations of a unit and/or article. For example, and without limitation, origination datum 208 may include one or more streets, towns, cities, capitols, states, countries, and the like thereof. As a further non-limiting example, origination datum 208 may include one or more addresses, longitudes, latitudes, and/or geographical markers. In an embodiment, and without limitation, origination datum 208 may include an address of a vendor and/or client. Internal memory 304 may be configured to determine a progression vector 212. As used in this disclosure a "progression vector" is a data structure that represents one or more a quantitative values and/or measures progression. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes. For example, and without limitation, progression vector 212 may be a value of 30 denoting that an article and/or unit is nearing the terminus location. As a further non-limiting example, progression vector 212 may be a value of 2 denoting that an article and/or unit is close to the origination location.

In an embodiment, and without limitation, progression vector 212 may be determined as a function of origination datum 208 and terminus datum 216 using a classifier 220, wherein terminus datum 216 includes any of the terminus datum as described above in detail. As used in this disclosure a "classifier" is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a processes whereby a computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 2, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 2, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Figure 3:
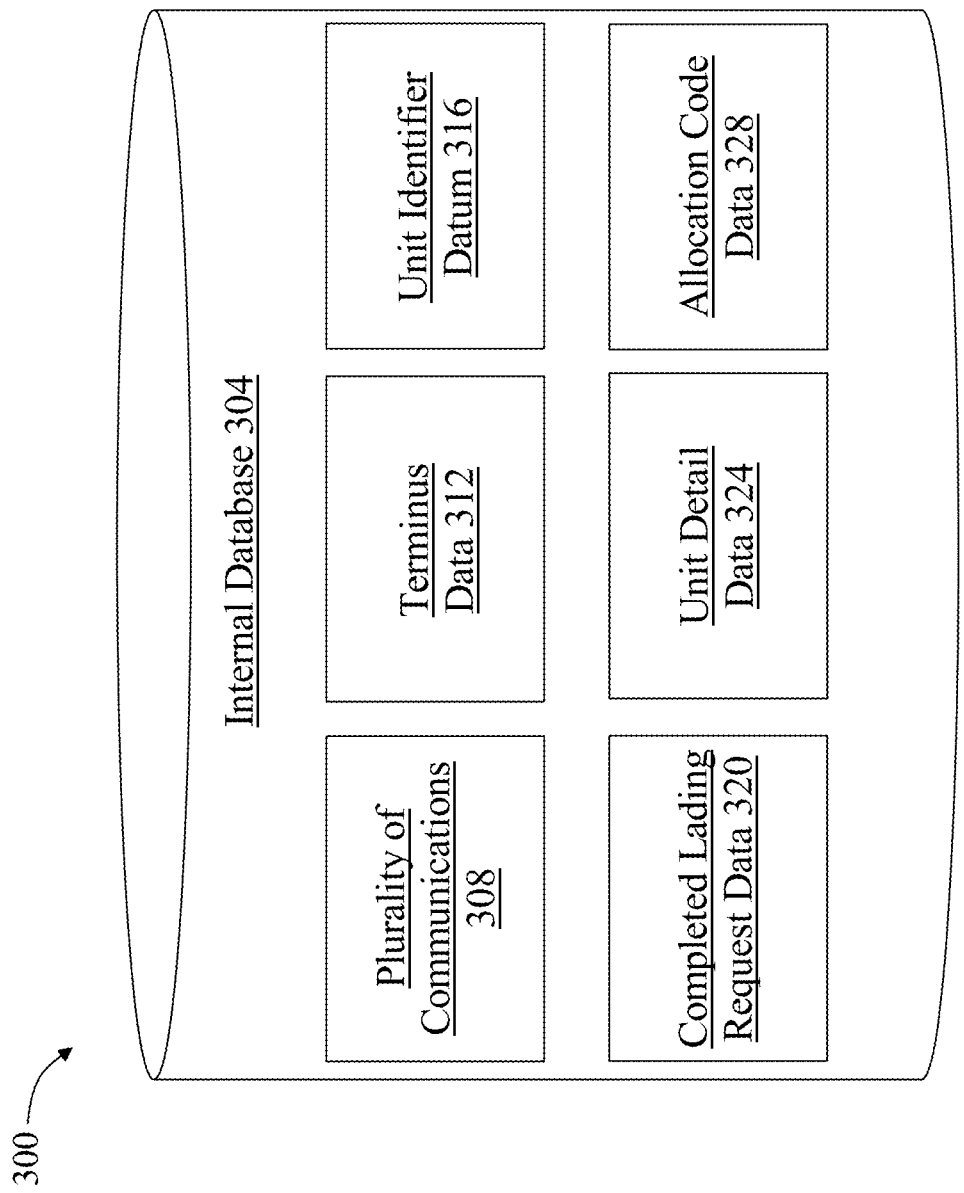
FIG. 3 is a block diagram illustrating an exemplary embodiment of an internal database.

Referring now to FIG. 3, an exemplary embodiment of internal database 304 is illustrated. Internal database 304 may include any data structure for ordered storage and retrieval of data, which may be implemented as a hardware or software module. Internal database 304 may be implemented, without limitation, as a relational database, a key-value retrieval datastore such as a NOSQL database, or any other format or structure for use as a datastore that a person skilled in the art would recognize as suitable upon review of the entirety of this disclosure. Internal database 304 may include a plurality of data entries and/or records corresponding to elements as described above. Data entries and/or records may describe, without limitation, data concerning the plurality of communications, terminus datum, unit identifier datum, completed transport request data, unit detail datum, and allocation code data. Internal database 304 may include, as a non-limiting example, a plurality of communications data 308. Plurality of communications data 308 may be a table storing each communication of the plurality of communications obtained from client device 308. For instance, and without limitation, internal database 304 may include plurality of communications data 308 listing each communication of the plurality of communications and associated unique identifier, such as "5500192446".

Continuing to refer to FIG. 3, internal database 304 may include, as a non-limiting example, a Terminus data 312. Terminus data table 312 may be a table storing terminus datum 216 generated by computing device 104 as a function of interrogating each communication of the plurality of communications obtained from client device 112. For instance, and without limitation, internal database 304 may include a terminus data 312 listing the terminus datum generated by computing device 104 as a function of interrogating each lading request 108 obtained from client device 112, such as "Magnum Warehousing 1301 39$^{th}$ Street N Fargo, N. Dak. 58102". Internal database 304 may include, as a non-limiting example, a unit identifier data table 316. Unit identifier data table 316 may be a table storing unit identifier generated by computing device 104 as a function of interrogating each communication of the plurality of communications obtained from client device 112. For instance, and without limitation, internal database 304 may include a unit identifier datum listing a unit identifier datum generated by computing device 104 as a function of interrogating each communication of the plurality of communications received from client device 112, such as the unique identifier of "N303363", "K994002", "F110482", and the like.

Still referring to FIG. 3, internal database 304 may include, as a non-limiting example, a completed lading request data 320. Completed lading request data 320 may be a table storing completed lading request 140 initiated by computing device 104 as a function of the lading request obtained from client device 112. For instance, and without limitation, internal database 304 may include a completed lading request data 320 listing a completed lading request 140 generated by computing device 104 as a function of the lading request obtained from client device 112. Completed lading request 140 may include any completed lading request 140 as described in the entirety of this disclosure. Additionally or alternatively, internal database 304 may include, as a non-limiting example, a unit detail data 324. Unit detail data 324 may be a table storing the unit detail datum generated by computing device 104 as a function of interrogating each communication of the plurality of communications obtained from client device 112. For instance, and without limitation, internal database 304 may include a unit detail 324 listing a unit detail datum generated by computing device 104 as a function of interrogating each communication of the plurality of communications obtained from client device 112, such as the brief description of "Bracket, Front Right Bulkhead". In an embodiment, internal database 304 may include, as a non-limiting example, an allocation code data 328. Allocation code data 328 may be a table storing the allocation code. The allocation code may be received from a client and/or client device 112. For instance, and without limitation, internal database 304 may include allocation code data 328 listing an allocation code received from client device 112. The allocation code may include any allocation code as described in the entirety of this disclosure.

Figure 4:
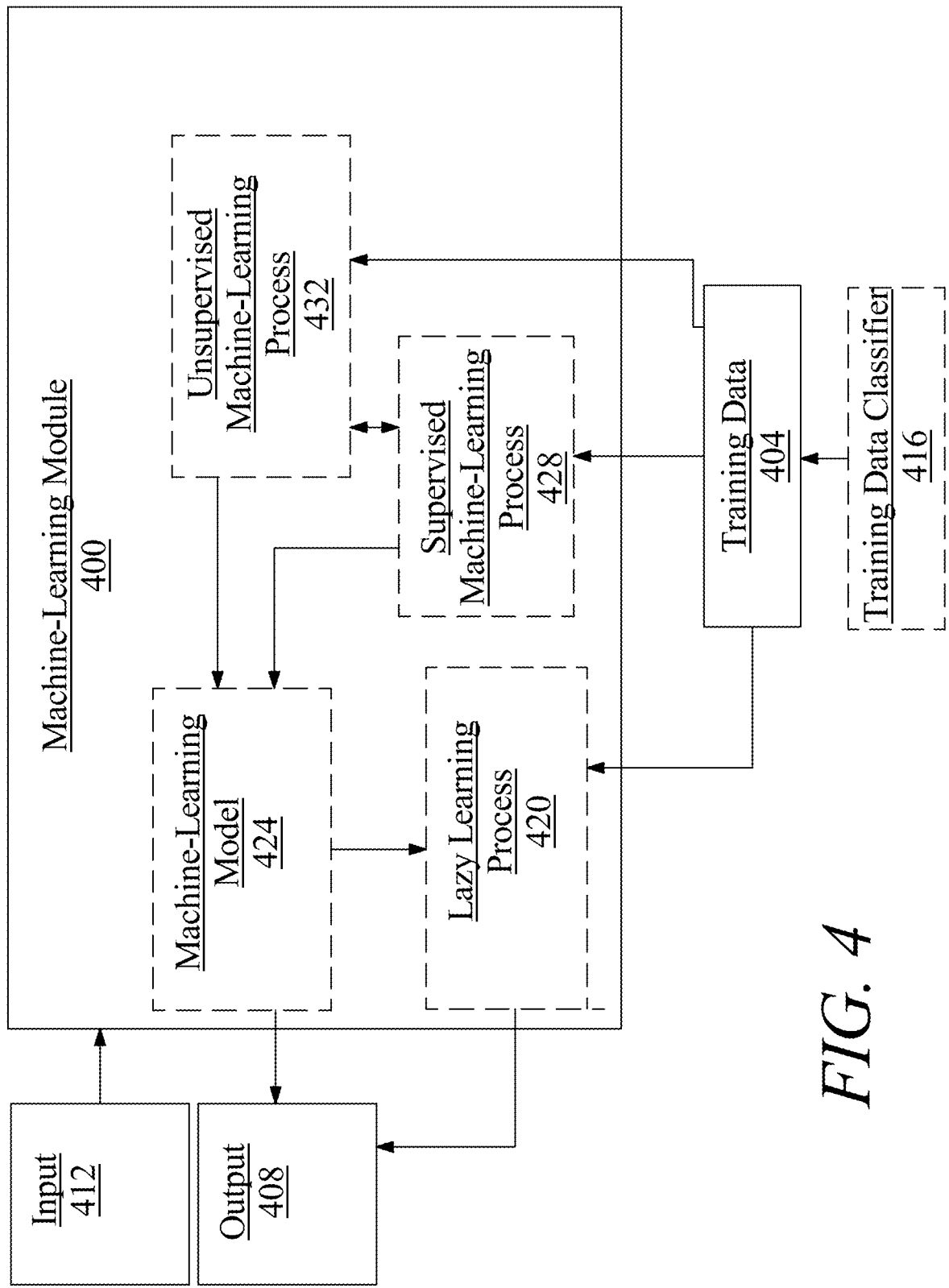
FIG. 4 is a block diagram of an exemplary embodiment of a machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example an input of a spot signature and/or lading request may relate to a logical route.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of spot signatures such as precontracted agreements, client strategies, route preferences and the like thereof.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include spot signatures and/or lading requests as described above as inputs, logical routes as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
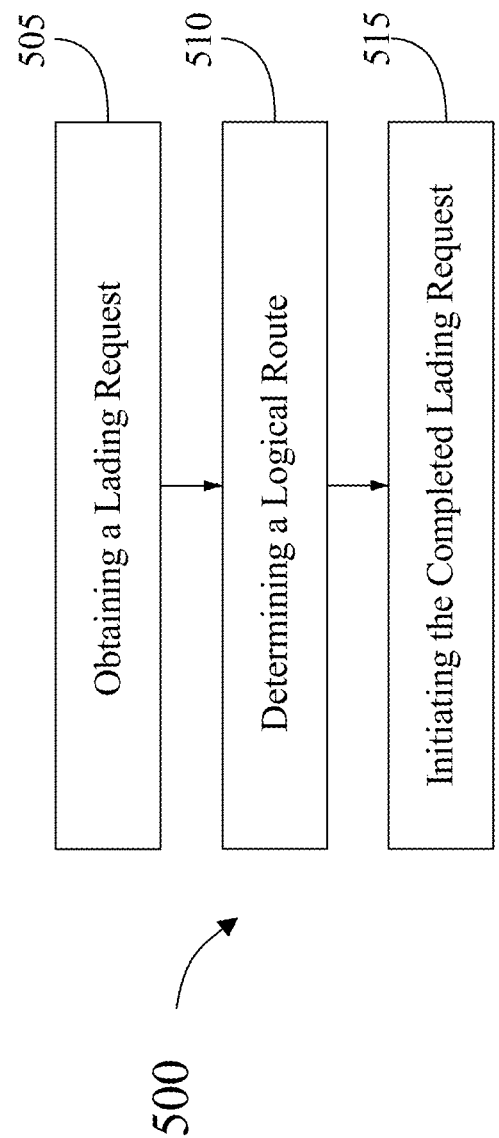
FIG. 5 is a flow diagram illustrating an exemplary embodiment of a method for initiating a completed lading request.

Now referring to FIG. 5, an exemplary embodiment of a method for initiating a completed lading request is illustrated. At step 505, a computing device 104 obtains a lading request 108 from a client device 112. Computing device 104 includes any of the computing device 104 as described above, in reference to FIGS. 1-4. Lading request 108 includes any of the lading request 108 as described above, in reference to FIGS. 1-4. Client device 112 includes any of the client device 112 as described above, in reference to FIGS. 1-4. Lading request 108 comprises a communication detail datum 116. Communication detail datum 116 includes any of the communication detail datum 116 as described above, in reference to FIGS. 1-4.

Still referring to FIG. 5, at step 510, computing device 104 determines a logical route 120 as a function of lading request 108. Logical route 120 includes any of the logical route 120 as described above, in reference to FIGS. 1-5. Computing device 104 determines logical route 120 as a function of receiving a conveyor indicator 124. Conveyor indicator 124 includes any of the conveyor indicator 124 as described above, in reference to FIGS. 1-4. Computing device 104 identifies a spot signature 128 as a function of conveyor indicator 124. Spot signature 128 includes any of the spot signature 128 as described above, in reference to FIGS. 1-4. Computing device 104 determines logical route 120 as a function of training a route machine-learning model 132 using a route training data 136. Route machine-learning model 132 includes any of the route machine-learning model 132 as described above, in reference to FIGS. 1-4. Route training data 136 includes any of the route training data 136 as described above, in reference to FIGS. 1-4. Computing device 104 determines logical route 120 as a function of spot signature 128 and lading request 108 using the route machine-learning model 132.

Still referring to FIG. 5, at step 515, computing device 104 initiates a completed lading request 140 as a function of logical route 120. Completed lading request 140 includes any of the completed lading request 140 as described above, in reference to FIGS. 1-4. Computing device 104 initiates completed lading request 140 as a function of receiving an acknowledgement element 144. Acknowledgement element 144 includes any of the acknowledgement element 144 as described above, in reference to FIGS. 1-4.

Figure 6:
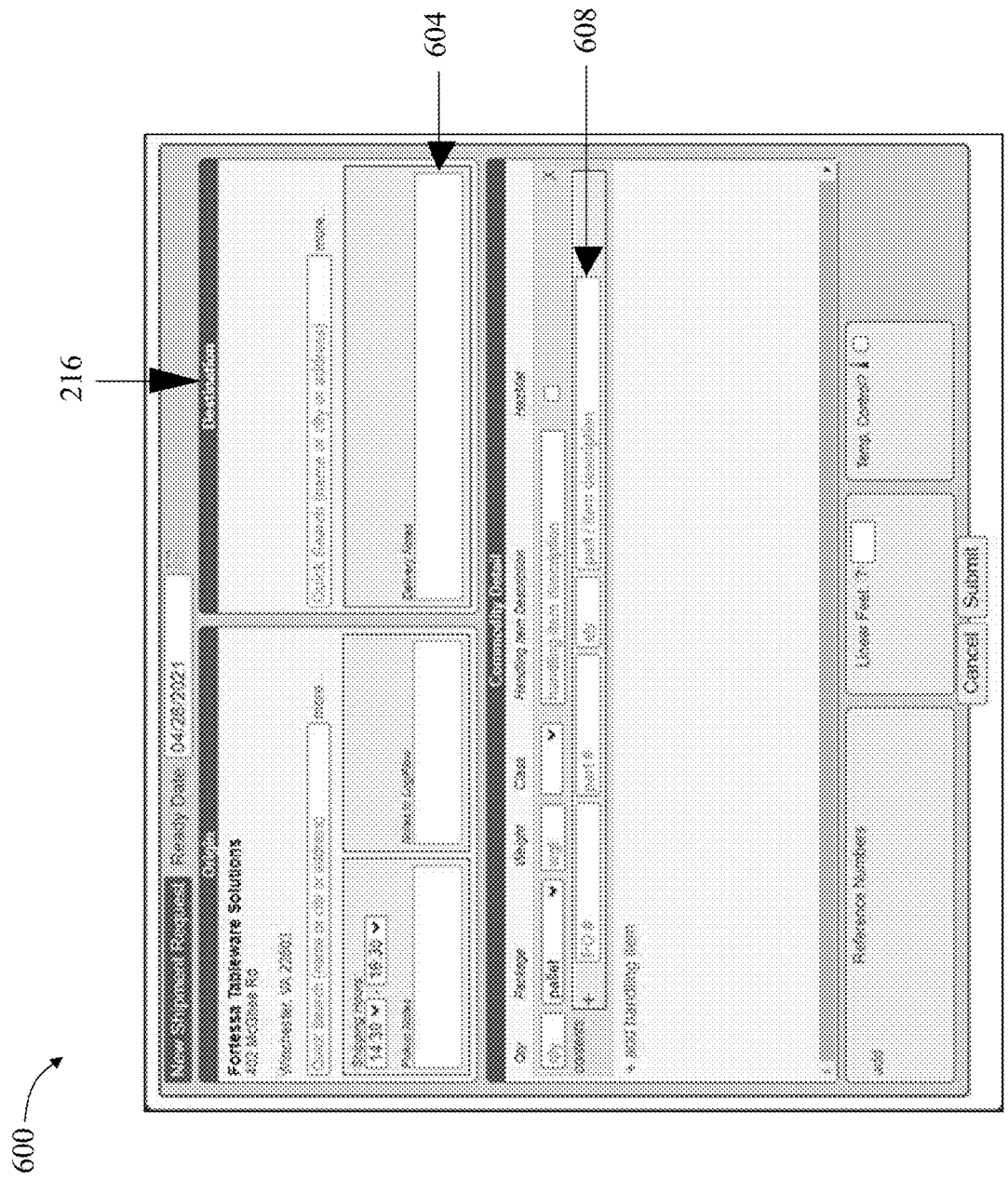
FIG. 6 is a screenshot illustrating an exemplary embodiment of a lading request.

Referring now to FIG. 6, an exemplary embodiment 600 of a visual representation of lading request 108 is illustrated. In an embodiment, lading request 108 may be represented in a display window at a display of client device 112. Lading request 108 may include any lading request 108 as described above in further detail in reference to FIGS. 1-5. Lading request 108, in the instant embodiment, is generated, by computing device 104 as a function of obtaining the lading request from client device 112, wherein client device 112 includes any of the client device 112 as described above, in reference to FIG. 105. Lading request 108 may include a compilation of data, wherein the data may include, without limitation, a terminus datum 216, a unit magnitude datum, a unit detail datum, and an allocation code, wherein a terminus datum 216, a unit magnitude datum, a unit detail datum, and an allocation code are each described above in detail, in reference to FIGS. 1-5. In an embodiment, and without limitation, lading request 108 may include a delivery note 604. As used in this disclosure a "delivery note" is a comment and/or communication relating to terminus datum 216. For example, and without limitation, delivery note 604 may include delivery instructions and/or handling instructions associated with a lading. In another embodiment, and without limitation, lading request 108 may include an article detail 608. As used in this disclosure an "article detail" is a description and/or identification of a part and/or item. For example, and without limitation, article detail 608 may include one or more details such as part sizes, part fittings, thread sizes, dimensions, weights, and the like thereof.

Figure 7:
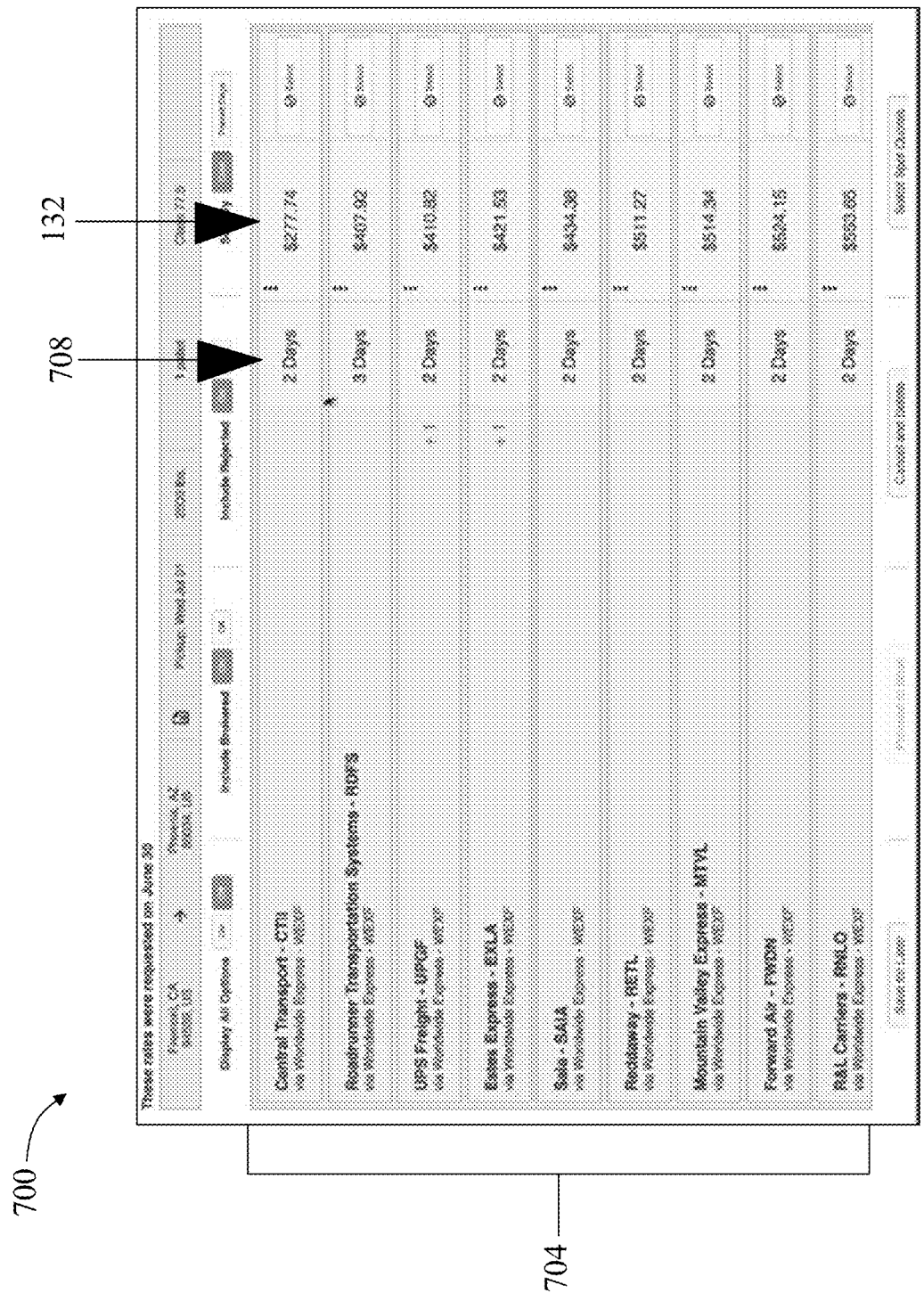
FIG. 7 is a screenshot illustrating an exemplary embodiment of an index of available conveyors.

Now referring to FIG. 7, an exemplary embodiment 700 of an index of available conveyors 704 is illustrated. As used in this disclosure an "index of available conveyors" is a list and/or arrangement of couriers that are available and/or willing to transport an item from the origin to the terminus. In an embodiment, and without limitation, index of available conveyors 704 may include a plurality of couriers and/or conveyors that are arranged by a shipping time 708. As used in this disclosure a "shipping time" is a temporal period that represents the amount of time required to transport an item, article, and/or unit from the origin to the terminus, wherein a temporal period is a period of time such as seconds, minutes, hours, days, weeks, months, years, and the like thereof. For example, and without limitation, shipping time 708 may include a temporal period of two days, one month, three weeks, and the like thereof. In another embodiment, and without limitation, index of available conveyors 704 may include a plurality of couriers and/or conveyors that are arranged by spot signature 128. Spot signature 128 includes any of the spot signature 128 as described above, in reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
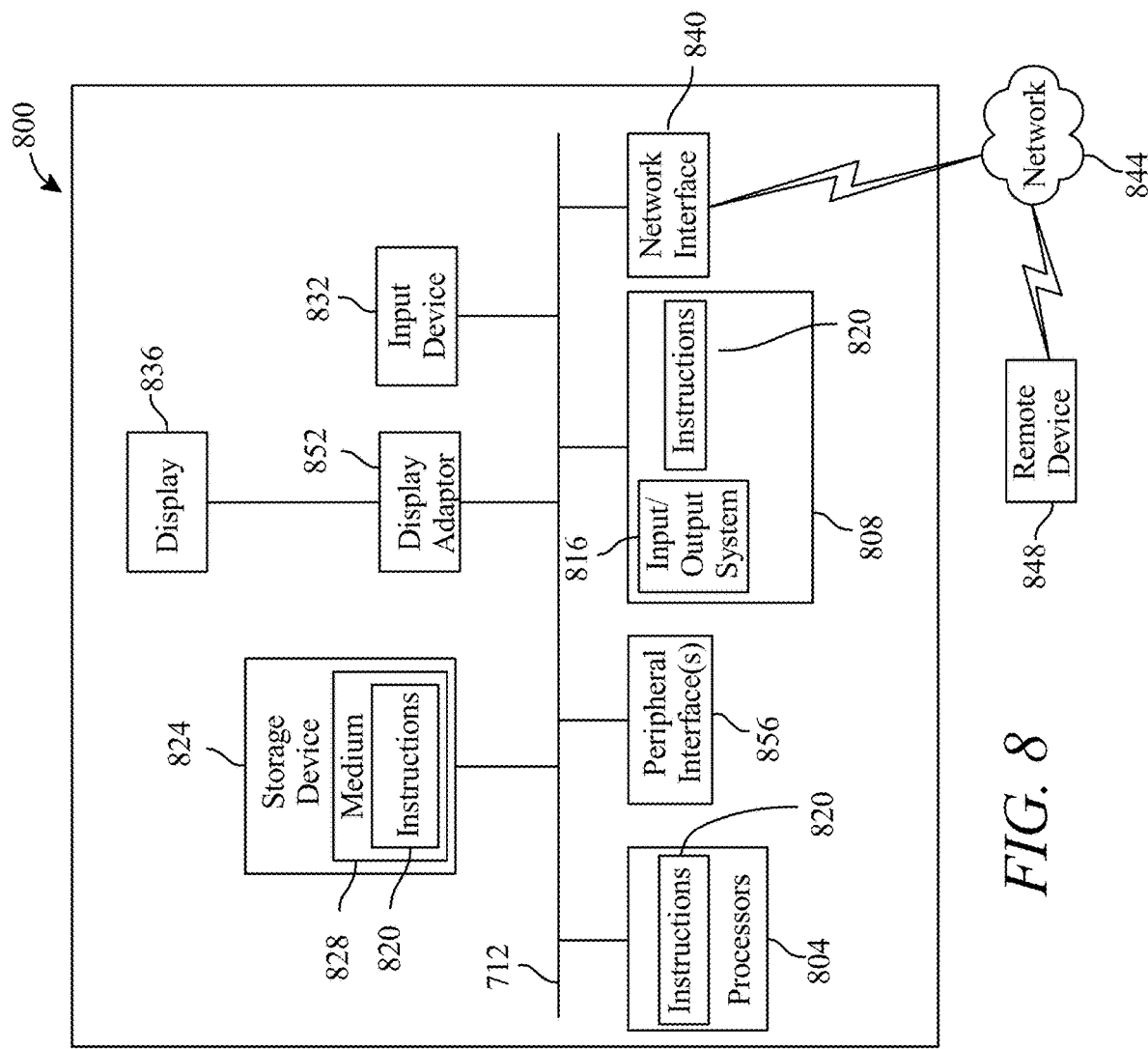
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for initiating a completed lading request, the system comprising a computing device, wherein the computing device is configured to:

obtain a lading request from a client device;
identify a communication detail datum of the lading request using a language processing module, wherein the language processing module is configured to:
extract at least a word from the communication detail datum; and
determine a positive or negative association between the at least a word and a bound datum of the communication detail datum;
determine a logical route as a function of the communication detail datum of the lading request, wherein determining the logical route further comprises:
receiving a conveyor indicator;
identifying a spot signature as a function of the conveyor indicator; and
determining the logical route as a function of the spot signature and the lading request using a route machine-learning model; and
initiate a completed lading request as a function of the logical route, wherein initiating the completed lading request further comprises:
receiving an acknowledgement element; and
initiating the completed lading request as a function of the acknowledgement element.

2. The system of claim 1, wherein obtaining the lading request includes storing the lading request in an internal memory.

3. The system of claim 2, wherein the internal memory is configured to:
identify an origination datum;
determine a progression vector as a function of the origination datum and a terminus datum using a classifier; and
update as a function of the progression vector.

4. The system of claim 3, wherein updating the internal memory further comprises receiving an input from an internal database and updating the internal memory as a function of the input from the internal database.

5. The system of claim 1, wherein identifying the spot signature further comprises obtaining a precontractual obligation as a function of an available conveyor.

6. The system of claim 1, wherein determining the logical route further comprises:
identifying a demarcation time; and
determining the logical route as a function of the demarcation time and the lading request using a demarcation machine-learning model.

7. The system of claim 1, wherein determining the logical route further comprises:
generating an index of available conveyors as a function of the spot signature; and
determining the logical route as a function of the index of available conveyors.

8. The system of claim 7, determining the logical route further comprises:
displaying the index of available conveyors on a display window;
receiving a user input as a function of the index of available conveyors; and
determining the logical route as a function of the user input.

9. The system of claim 8, wherein initiating the completed lading request further comprises presenting the completed lading request in the display window.

10. The system of claim 1, wherein receiving the acknowledgement element further comprises:
transmitting a notification to a conveyor; and
receiving the acknowledgement element as a function of the notification.

11. A method for initiating a completed lading request, the method comprising:
obtaining, by a computing device, a lading request from a client device;
identifying, by a language processing module, a communication detail datum of the lading request, wherein the language processing module is configured to:
extract at least a word from the communication detail datum; and
determine a positive or negative association between the at least a word and a bound datum of the communication detail datum;
determining, by the computing device, a logical route as a function of the communication detail datum of the lading request, wherein determining the logical route further comprises:
receiving a conveyor indicator;
identifying a spot signature as a function of the conveyor indicator;
training a route machine-learning model using a route training data correlating the spot signature to the lading request; and
determining the logical route as a function of the spot signature and the lading request using the trained route machine-learning model;
initiating, by the computing device, the completed lading request as a function of the logical route, wherein initiating the completed lading request further comprises:
receiving an acknowledgement element; and
initiating the completed lading request as a function of the acknowledgement element.

12. The method of claim 11, wherein obtaining the lading request includes storing the lading request in an internal memory.

13. The method of claim 12, wherein the internal memory is configured to:
identify an origination datum;
determine a progression vector as a function of the origination datum and a terminus datum using a classifier; and
update as a function of the progression vector.

14. The method of claim 13, wherein updating the internal memory further comprises receiving an input from an internal database and updating the internal memory as a function of the input from the internal database.

15. The method of claim 11, wherein identifying the spot signature further comprises
obtaining a precontractual obligation as a function of an available conveyor.

16. The method of claim 11, wherein determining the logical route further comprises:
identifying a demarcation time; and
determining the logical route as a function of the demarcation time and the lading request using a demarcation machine-learning model.

17. The method of claim 11, wherein determining the logical route further comprises:
generating an index of available conveyors as a function of the spot signature; and
determining the logical route as a function of the index of available conveyors and the lading request using a conveyor machine-learning model.

18. The method of claim 17, determining the logical route further comprises:
- displaying the index of available conveyors on a display window;
- receiving a user input as a function of the index of available conveyors; and
- determining the logical route as a function of the user input.

19. The method of claim 18, wherein initiating the completed lading request further comprises presenting the completed lading request in the display window.

20. The method of claim 11, wherein receiving the acknowledgement element further comprises:
- transmitting a notification to a conveyor; and
- receiving the acknowledgement element as a function of the notification.

* * * * *